Feb. 3, 1970
J. A. ALDRICH ET AL
3,492,742
EXTENDED RANGE HIT INDICATOR SYSTEM
Filed Feb. 28, 1967
3 Sheets-Sheet 1
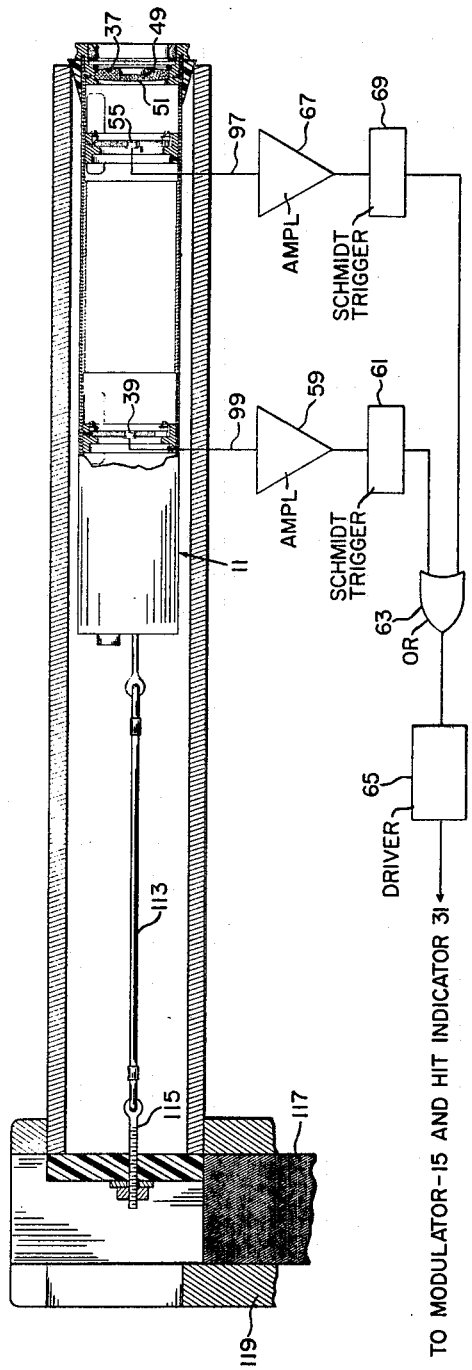
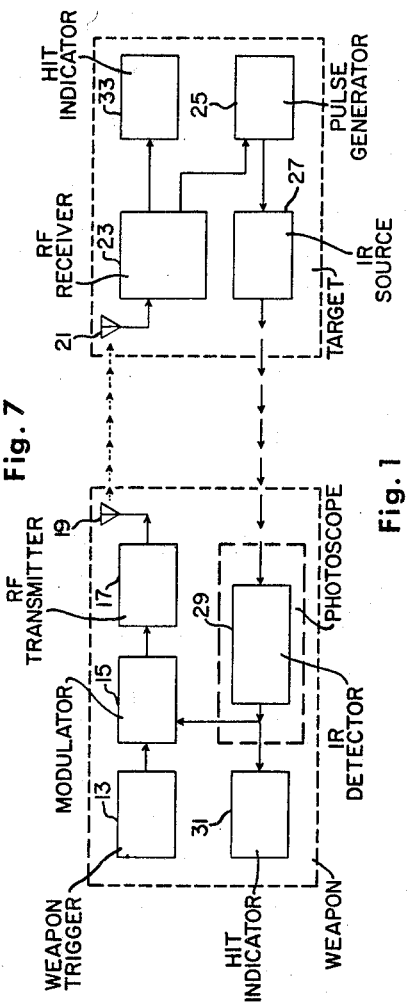
JOHN A. ALDRICH
JON R. BERRY
PHILLIP M. KNAPP
PAUL E. WRIGHT
        *INVENTOR.*
BY Feb. 3, 1970  J. A. ALDRICH ET AL  3,492,742
EXTENDED RANGE HIT INDICATOR SYSTEM
Filed Feb. 28, 1967  3 Sheets-Sheet 2

JOHN A. ALDRICH
JON R. BERRY
PHILLIP M. KNAPP
PAUL E. WRIGHT
  INVENTOR.

Feb. 3, 1970    J. A. ALDRICH ET AL    3,492,742
EXTENDED RANGE HIT INDICATOR SYSTEM
Filed Feb. 28, 1967    3 Sheets-Sheet 3
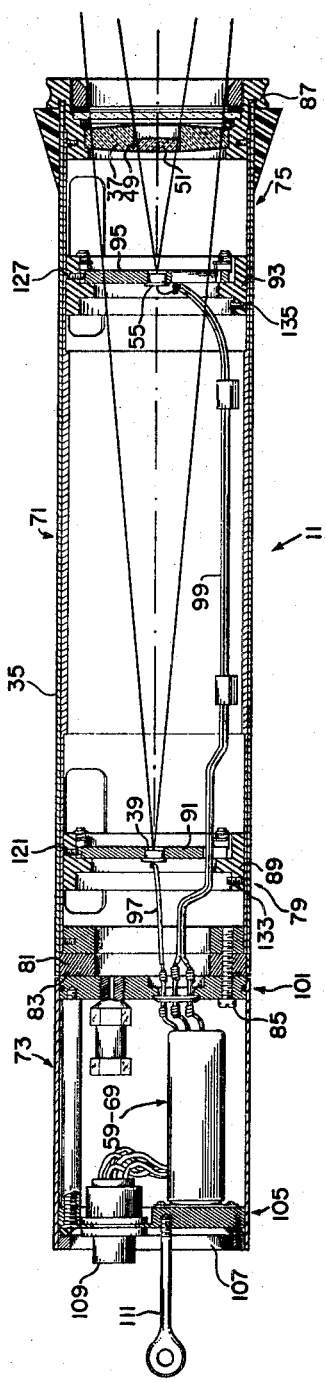
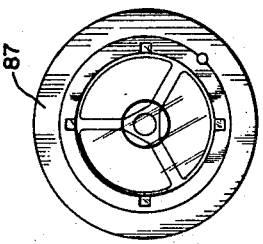
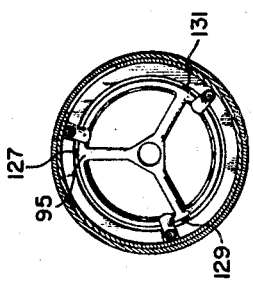
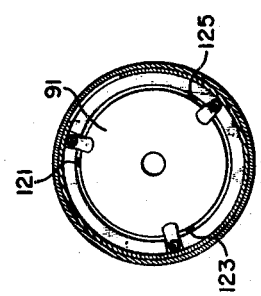
JOHN A. ALDRICH
JON R. BERRY
PHILLIP M. KNAPP
PAUL E. WRIGHT
        INVENTOR.
BY

United States Patent Office 3,492,742
Patented Feb. 3, 1970

3,492,742
EXTENDED RANGE HIT INDICATOR SYSTEM
John A. Aldrich, Lutherville, Paul E. Wright, Owings Mills, Phillip M. Knapp, Cockeysville, and Jon R. Berry, Lutherville, Md., assignors to AAI Corporation, Cockeysville, Md., a corporation of Maryland
Filed Feb. 28, 1967, Ser. No. 619,364
Int. Cl. F41g 3/26
U.S. Cl. 35—25                                    30 Claims

ABSTRACT OF THE DISCLOSURE

A hit indicator system is disclosed for simulated hit-kill field practice which permits the use of a standard tank cannon with a photoelectric telescope which may be inserted inside the cannon barrel. The photoelectric telescope has a coaxial multiple lens and photodetector arrangement which provides an extended range. The arrangement is an improvement particularly applicable to hit indicator arrangements as shown in U.S. Patent Nos. 3,104,478 and 3,169,191.

---

In U.S. Patent No. 3,104,478, a hit indicator system is disclosed for use in tactical field training of personnel on a realistic basis. In such a system, apparatus is connected to a weapon, for example, a tank cannon, so that when a gunner aims the tank cannon at a target, for example, another tank, and operates the firing mechanism of the tank cannon, an omnidirectional radio frequency target interrogation signal is transmitted. The radio frequency signal causes an infrared light source centrally mounted on the target to radiate a light signal. If the tank cannon is properly aimed, a photoelectrically responsive element, such as a photodiode, having a light sensitive surface of variable sensitivity, disposed at, or near, the focal plane of a telescopic lens arrangement, such being hereinafter referred to as a photoscope or a photoelectric telescope, which is attached to the tank cannon and suitably aligned therewith, will receive the infrared light signal and cause an electrical signal output having an amplitude which is a function of the intensity of the light signal received by the photoscope and which may desirably cause the apparatus to produce another radio frequency signal which informs the tank target that a hit has been scored. In addition, or alternatively, the weapon-connected apparatus may desirably produce a signal informing the gunner that a hit has been scored.

For use in simulated hit-kill practice, it is necessary to use a photoscope having a range which desirably approaches the effective range of the weapon which, in this case, is a tank cannon. That is to say, when the target is located within the effective range of the tank cannon which is properly aimed at the target, the photoscope should desirably be capable of receiving and detecting a light signal from an infrared source mounted on top of the target. The parameters which determine the range of a photoscope are: the intensity of the light source; the diameter and focal length of the lens in the optical system; and the sensitivity and size of the photodiode having a decreasing sensitivity variation from the center to the edge of the light sensitive surface. With any given combination of these parameters, a maximum and a minimum range of the photoscope may be defined. The maximum range of the photoscope is the distance along the optical axis from the lens to the target that a light signal from the light source mounted on top of the target can be focused on the center of the light sensitive surface of the photodiode with sufficient intensity to cause an electrical signal output having an amplitude that is great enough to actuate the electrical apparatus associated with the hit indicator system which may be defined as an electrical signal output of useful value. The minimum full-hit range of the photoscope is the distance from the lens to the target at which the angle subtended by the height of the target equals the angular field of view from the optical axis to the radially outer effective edge of the photoelectrically responsive element. For purposes of subsequent description in this application, the term minimum range will refer to the minimum full-hit range because it is the closest distance at which the optical axis of the photoscope can intersect the target at substantially all major points, and the light signal from the infrared light source mounted centrally on the top of the target will be focused on the light sensitive surface of the photodiode to cause an electrical signal output of useful value. At a closer range, while the photoscope will detect upper target area hits in the vicinity of the light source, the photoscope, when aimed at the lower area of the target, will fail to receive the light signal even though the weapon axis and the photoscope optical axis intersect the target, because the light source is outside the angular field of view. The closer the range inside this minimum range, the smaller the detectably vulnerable area and the greater is the source of error.

A photoscope having a single lens optical system and a single photo-electrically responsive element is not entirely satisfactory when installed in the barrel of a tank cannon, because the minimum range, as hereinbefore defined, is not sufficiently coextensive with the minimum effective range of the tank cannon. The effective minimum range of a tank cannon obviously extends from the end of the cannon barrel. However, in order for a photoscope having a single lens-photodiode arrangement to achieve a maximum range corresponding to the maximum range of the tank cannon, the minimum effective range of the photoscope for practical available lenses and photodiodes has been found to be approximately 400 meters, which obviously does not approach the minimum effective range of the tank cannon. While it is theoretically possible to vary either the light source, the optical system, or the photoresponsive element to obtain a photoscope with the desired range, the limitations of commercially obtainable components render it impractical to obtain the desired range capabilities with a photoscope having a single lens-photodiode arrangement.

Theoretically, a shorter minimum range could be obtained by decreasing the focal length of the optical system and increasing the size of the light sensitive surface of the photodiode. A shorter focal length can be obtained with relatively inexpensive, commercially obtainable lenses by two methods: using a lens with a smaller diameter, or using a combination of lenses. The first method is impractical because the photoscope must still have the maximum range that is coextensive with the maximum range of the cannon. The intensity of the light signal focused on the light sensitive surface of the photodiode is determined by the amount of light entering the photoscope and the intensity of the light source. If a smaller diameter lens is used, a more intense light source must be used in order for the photodiode to provide an electrical signal output of useful value when the light source is at the maximum effective range of the tank cannon. However, it is undesirable to increase the intensity of the light source because a more intense light source is much more expensive and complex and requires a much larger power supply. The second method is impractical not only because of the increased cost, but also because of the difficulty in matching the optical characteristics of the combined lenses.

However, even if the focal length of the optical system is reduced, it is still impractical to obtain a photoscope having a desirably short minimum range because of the limitations of commercially obtainable photodiodes. For one thing, the type of photodiode used in the photoscope is determined to some extent by the signal-to-noise ratio, which is the ratio of the magnitude of the electrical output signal to the random electrical variations generated internally in the photodiode and also caused by the background light. The reason for having a high signal-to-noise ratio is to prevent the electrical signal output from being obscured by the level of the noise in the photodiode and thereby provide a sharp signal for actuating the electrical apparatus associated with the photoscope in the hit indicator system. The types of photodiodes that are commercially obtainable are very limited. Photodiodes made of silicon are commercially obtainable in a variety of sizes, some of rather large size, but the signal-to-noise ratio is low and this gives a poor response to the light signal from the target. Also, with a large light sensitive surface, the background light in the field of view causes a larger value of direct current to go through the photodiode which increases the noise level. It has been found that photodiodes made of germanium provide a satisfactory signal-to-noise ratio, but unfortunately such diodes are commercially obtainable in only a relatively small size. Consequently, the size of the light sensitive surface of the photodiode is fixed by the practical consideration that only one desirable photodiode is commercially obtainable.

In spite of the fact that only one type of desirable photodiode is commercially obtainable, such photodiodes have a further, overriding limitation which renders it impractical to obtain a photoscope having a desirably short minimum range with only a single lens-photodiode combination. The overriding limitation is the limited sensitivity variation gradient of the light sensitive surface of the photodiode. As previously discussed, the effective sensitivity of the light sensitive surface of the photodiode is desirably varied so as to compensate for the increasing linear field of view with increasing target range, and thereby maintain a constant detectably vulnerable area. However, the sensitivity variation gradient of the light sensitive surface of a commercially obtainable photodiode is controllable over a rather limited range, thereby permitting compensation for the field of view over a limited interval of range. Consequently, even if the focal length of the optical system were reduced and the size of the light sensitive surface of the photodiode increased, it would still be impractical for a photoscope with a single lens-photodiode combination to have a minimum range desirably approaching the minimum effective range of a tank cannon because of the limited sensitivity variation gradient of the light sensitive surface of a commercially obtainable photodiode.

Since it is desirable to have a hit indicator system that permits the tactical field training of personnel on as realistic basis as possible, it is a feature of the present invention to provide a photoscope which can be inserted in the barrel of a tank cannon and have a range extending from the maximum effective range of the cannon to a desirably short minimum range which is less than that provided by a conventional single lens optical system photoscope. It is an additional feature of the invention to provide an inexpensive photoscope which can be constructed with commercially obtainable components.

In accordance with the present invention, a photoscope having a dual optical system is provided, with two different, preferably slightly overlapping, range capabilities. The dual photoscope system has two lenses and two photodiodes wherein the first lens and photodiode combination provides an interval of range approximately the same as the photoscopes used in the past. The second lens, having a much shorter focal length than the first lens, is combined with the second photodiode to provide a desirably short minimum range and a maximum range which slightly overlaps the minimum range of the first lens and photodiode combination. Each photodiode is electrically connected through an amplifier and a Schmitt trigger to an OR gate circuit which supplies an electrical pulse to a driver, modulator, and hit indicator, which forms a portion of the remainder of the electrical apparatus associated with a hit indicator system as described in the above referenced patents. By feeding the two photodiode outputs through threshold trigger circuits and an OR gate, an electrical output signal of useful value from either lens-photodiode subsystem will actuate the remainder of the electrical apparatus. By this unique photoscope design, the crossover between the ranges, forming the extended overall range, provided by the dual photoscope system is performed logically and a single output is provided.

According to the preferred embodiment of the present invention, a dual photoscope system is provided, in which two photoscope subsystems are coaxially arranged with the nodal points of the respective lenses and the centers of the light sensitive surfaces of the photodiodes on the same optical axis so as to provide a coaxial photoscope with an extended overall range. This can be done without reducing the area of the lens of the first photoscope subsystem by very much because the area of the second lens may preferably be much smaller in size than that of the first lens, such as, for example, approximately 5–10%. Because the area of the lens of the first photoscope subsystem remains substantially unchanged, sufficient light is still focused by the lens on the center of the light sensitive surface of the photodiode to provide a useful value of electrical signal output, when the infrared light source is located at the maximum effective range of the simulated weapon. The coaxial photoscope is particularly advantageous in tank weapon simulated firing, because it permits the mounting of the photoscope in the barrel of the weapon, thereby providing full protection against damage by tree branches, etc., as well as bore sighted alignment and minimizing of parallax problems, as such is preferably arranged according to the invention.

To avoid any problems in matching the optical characteristics of the two photoscope subsystems, it has been found that the best method of locating the short range photoscope subsystem within the long range photoscope subsystem is to bore or otherwise form a hole in the center of the large lens and mount the small lens within the large lens in lieu of using adjacent interfacing lenses. In this manner, the need for any supporting members necessary to position the small lens on the optical axis is eliminated, the small lens being secured within the concentric hole in the large lens as by an epoxy resin adhesive at the annular rim intersection, which will thereby provide the necessary support for the small lens. This is also desirable because extra supporting members, such as a spider, would reduce the amount of light being focused by the large lens on the light sensitive surface of the first photodiode. Although the small second lens may be located at other off-axis positions in the large first lens, it is much more desirable for it to be positioned on the same axis so as to avoid problems of parallax. Also, while it is possible to mount the second photodiode in the first lens and locate the second smaller lens forward of the first lens, this has the substantial disadvantage of reduction of the field of view and the amount of light focused by the large first lens on the first photodiode.

Still other objects, features and attendant advantages will become apparent to those skilled in the art from a reading of the following detailed description of a preferred embodiment and mode of practice of the invention taken in conjunction with the accompanying drawings wherein:

FIG. 1 is a block diagram of an overall "Hit Indicator" system utilizing a radio frequency link and an infrared link.

FIG. 2 illustrates the optical system of a single lens-photodiode photoscope wherein the angle subtended by a target of constant size, for example a tank, decreases with increasing range while the field of view increases with range. Also, it shows how a light signal from the target is focused on different zones of the light sensitive surface of the photodiode according to the range of the target. It further shows how a ray of light from a target subtended by an angle greater than half the angular field of view of the photoscope will not be focused in the light sensitive surface of the photodiode.

FIG. 7 is a schematic illustration of the major optical and electrical system components of a coaxial photoscope according to the invention, and illustrating the connection of the photodiode outputs through an OR gate circuit to the electrical apparatus associated with a hit indicator system as shown in FIG. 1.

FIG. 8 shows the detailed construction of a coaxial photoscope providing a dual photoscope system in accordance with the present invention.

FIG. 9 shows a detailed end view of the photoscope looking toward the photodiode associated with the small lens.

FIG. 10 shows a sectional view of the mounting of the photodiode associated with the large lens of the generally conventional photoscope system.

FIG. 11 shows a sectional view of the mounting of the photodiode associated with the small lens of the short range photoscope system.

Figure 2:
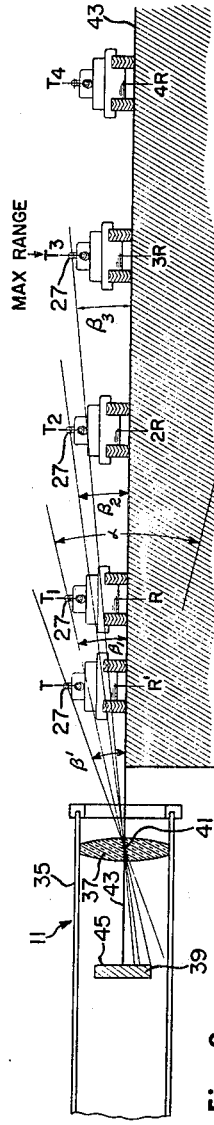

Referring now in detail to the figures of the drawings, FIG. 1 shows a hit indicator system to which the photoscope 11 of this invention is adaptable. In operation, when a tank gunner believes he has a target properly aligned with the sights of his tank cannon, he pulls a trigger 13 which results in a pyrotechnic display in the form of a blast. This also causes a pulse to be supplied to a modulator 15 which turns on a radio frequency transmitter 17 thereby causing a pulse signal to be transmitted omnidirectionally from an antenna 19 mounted on top of the tank. This signal is received by an antenna 21 at the target and detected in a receiver 23. The receiver 23 actuates a pulse generator 25 which causes an infrared source 27 mounted centrally on the target, so as to be readily visible from all directions, to radiate a pulse signal. If the tank cannon is properly aimed at the target, the infrared light signal is received by the infrared detector 29 which is contained in the photoscope 11. The infrared signal is focused on the infrared detector 29 and causes an electrical pulse to be supplied to both the modulator 15 and a hit indicator 31 of the tank. The pulse supplied to the modulator 15 causes another radio frequency signal to be transmitted to the target which actuates a target hit indicator 33 and a pyrotechnic display in the form of a blast thereby informing the target that a hit has been scored. The pulse supplied to the hit indicator 31 of the tank actuates it and informs the gunner that a hit has been scored.

FIG. 2 illustrates the optical problems associated with the design of a photoscope, generally indicated at 11 for use in a hit indicator system as shown in FIG. 1. The photoscope 11 generally consists of a tubular housing 35 for mounting in the barrel of the tank cannon. The tubular housing 35 contains a lens 37 mounted in the forward portion of the housing 35, and a photo-responsive element 39, mounted rearward of the lens 37. In the very center of the lens 37 is a nodal point 41 which may be defined as the point on the lens 37 through which a ray of light can pass undeflected. Passing perpendicularly through the lens 37 at the nodal point 41 is the optical axis 43 of the lens. The optical axis 43 of the lens 37 is desirably parallel to the tubular housing 35. Mounted perpendicularly to the optical axis 43 of the lens 37 and at the focal length of the lens 37 is a disc-shaped light sensitive surface 45 of the light responsive element 39, the center of which is positioned on the optical axis 43. The diameter of the light sensitive surface 45 and the focal length of the lens determine a field of view throughout which a light signal will be focused on the light sensitive surface. This field of view is subtended by an angle $\alpha$ wherein a ray of light can pass through the nodal point 41 of the lens 37 and strike the edge of the light sensitive surface 45 of the photodiode. At various ranges R, 2R and 3R are illustrated targets $T_1$, $T_2$, and $T_3$ of constant size with constant intensity infrared light sources 27 mounted thereon. The angles subtended by these targets are represented respectively by $\beta_1$, $\beta_2$, and $\beta_3$, and the light signals from the sources 27 are shown as being focused on the light sensitive surface 45 of the photodiode 39 at various points as indicated by rays of light passing through the nodal point 41 of the lens 37 and striking the light sensitive surface 45. Also shown in FIG. 2 is a target T' at range R' which is subtended by an angle $\beta'$ with the light signal from the source 27 mounted thereon not being focused on the light sensitive surface 45 of the photodiode 39 as indicated by a ray of light passing through the nodal point 41 of the lens 37 and not striking the light sensitive surface.

The light responsive element 39, in this instance, is an alloy junction photodiode which responds to a light signal input to cause an electrical signal output. The amplitude of the electrical signal output is a function of the intensity of the light focused on the light sensitive surface 45 of the photodiode 39, and the intensity of the light focused on the light sensitive surface 45 is a function of the distance, or range, from the nodal point 41 of the lens 37 to a target upon which is mounted an infrared light source 27. As the distance from the nodal point of the lens 37 to the target increases, the amplitude of the electrical signal output decreases to a threshold value. The amplitude of the electrical signal output which is just sufficient to operate the electrical apparatus associated with the hit indicator system may be defined as the minimum effective value.

Figure 3:
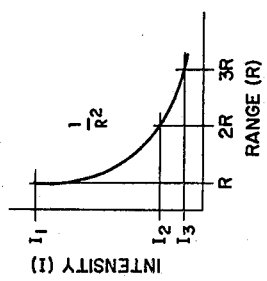
FIG. 3 shows how the intensity of the light focused on the light sensitive surface of a photodiode varies as a function of the range of the target.

When the constant intensity infrared light source 27 is on the optical axis 43 and at range R from the nodal point 41 of the photoscope lens 37, the light focussed on the light sensitive surface 45 has an intensity of I, as shown in FIG. 3 which produces an electrical signal output of a certain amplitude. As the source of light 27 is moved away from the photoscope 11, the intensity of the light signal focused on the light sensitive surface 45 decreases inversely according to the square of the distance, or range, between the nodal point 41 of the photoscope lens 37 and the target. Accordingly, when the target is at the range 2R the intensity of the light signal, $I_2$, is one fourth the intensity at R. When the target is at the range 3R, the intensity of the light signal $I_3$, is one ninth the intensity at R. Since the amplitude of the electrical signal output is a function of the intensity of the light signal focused on the light sensitive surface 45 of the photodiode 39, it is readily apparent that the amplitude of the electrical signal output decreases inversely according to the square of the range of the target. As a target is moved further from the photoscope 11 the electrical signal output decreases to a threshold value. The farthest distance from the nodal point 41 of the lens 37, that is to say the greatest range, that a light signal from the infrared light source 27 can cause the photodiode to produce an electrical signal output of minimum useful value may be defined as the maximum range of the photoscope. Beyond the maximum range of the photoscope 11, the intensity of the light focused on the light sensitive surface 45 of the photodiode 39 is insufficient to produce an electrical signal output of useful value. For purposes of illustration, assume that range 3R represents the maximum range of the photoscope and that $I_3$ represents the intensity of light signal focused on the light sensitive surface 45 of the photodiode 39 at that range which is just sufficient to produce an electrical signal output having an amplitude of minimum useful value.

Figure 4:
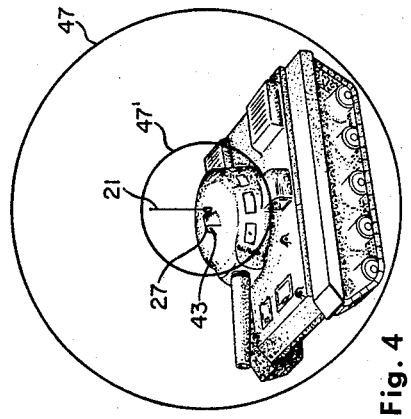
FIG. 4 shows how the area of the tank encompassed by the field of view of the photoscope varies according to the range of the target.

As seen in FIG. 2, the field of view, that is the area visible to the light sensitive surface 45 and subtended by the angle $\alpha$, increase with range. Also, it can be seen that the targets $T_1$, $T_2$, and $T_3$, which are shown as identical in height, are subtended by angles $\beta_1$, $\beta_2$, and $\beta_3$ respectively which decrease as the range increases. Consequently, it is readily apparent that as the target range increases, the field of view increases while the angle subtended by the target decreases. FIG. 4 illustrates a problem resulting from this relationship.

In FIG. 4 is shown a target, for example another tank, with an infrared source 27 centrally mounted on top of the turret so as to be readily visible from all points of view. Circle 49 represents the field of view of the photoscope at some particular range, such as R', with the light source 27 and optical axis 43 of the photoscope being coincident. Since the optical axis 43 of the photoscope 11 is bore sighted with the tank cannon, the area circumscribed by the circle 49 represents the vulnerable area of the target which the optical axis 43 of the photoscope 11 can intersect and receive the light signal from the infrared light source 27 mounted on top of the tank turret. As a result, provided the target range does not exceed the target, that is the area circumscribed by the circle 47, increases with size. The size of the circle at range R is indicated by a circle 47. As the range increases, the area of the target occupies a smaller portion of the field of view and consequently the vulnerable area of the target becomes much greater than the actual size of the target. As a result, provided the target range does not exceed the maximum range of the photoscope, without compensation of some type it would be possible for a tank gunner to score a hit by just aiming the tank cannon in the general direction of the target. The practical effect would thus be that the greater the range of the target, the greater the allowable aiming error. This is obviously undersirable, because it means that a tank gunner need exercise less accuracy at a greater range than at a closer range which is just the opposite of a realistic situation.

It should be noted that although the area of vulnerability as herein defined encompasses more than just the area occupied by the target no matter what the range is, the field of view of the photoscope, and consequently the vulnerable area of the target, can be made to more closely approximate the true shape of the target by employing suitably shaped photodiode masks according to the teachings of U.S. Patent No. 3,083,474.

To compensate for the increasing field of view with respect to range, so that the vulnerable area of a target is made independent of, or substantially less dependent on, target range, the photodiode 39 is provided with a light sensitive surface 45 such that the amplitude of the electrical signal output decreases inversely approximately according to the square of the displacement of the point of light from the center of the light sensitive surface 45. This is shown graphically in FIG. 5 wherein the sensitivity of the light sensitive surface of the photodiode is plotted as a function of the radius (X) of the point of light from the center of the light sensitive surface 45. When a light signal from a light source 27 mounted on a target is focused to a point in the center of the light sensitive surface 45, the electrical signal output is at a maximum value. As this point of light is focused on various portions of the light sensitive surface 45 from the center to the edge, the electrical signal output decreases from a maximum value to a lesser value. Remembering that the electrical signal output is also a function of the intensity of the light striking the light sensitive surface 45, it is readily seen that to produce the same amplitude of electrical signal output as the point of light is focused further away from the center of the light sensitive surface, the light signal must be more intense. Since the radius on the light sensitive surface 45 from the point where the light signal is focused to the center of the light sensitive surface which is intersected by the optical axis is subtended by an angle which is equal to the angle subtended by the displacement of the light source mounted on the target to the optical axis which is bore sighted with the tank cannon, the position of the point where the light signal is focused on the light sensitive surface bears a direct relation to the position of the target in the field of view of the photoscope. This relationship is utilized so as to make the vulnerable area of the target independent of, or at least substantially less dependent on, range.

Figure 5:
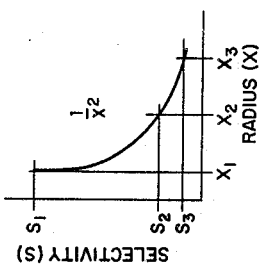
FIG. 5 illustrates a manner of compensation for increasing field of view with increasing range, by variation of the sensitivity of the light sensitive surface from the center to the edge of the photodiode surface.

As shown enlarged for purposes of illustration in FIG. 2, a light signal from the target $T_1$, at range R, having an intensity $I_1$, as shown in FIG. 3, will be focused on the edge of the light sensitive surface 45 at the radius $X_3$ having a sensitivity of $S_3$, as shown in FIG. 5, to produce an electrical signal output of minimum useful value. If the light source is moved further from the photoscope 11 along the angle $\beta_1$ which the target $T_1$ subtends at the range R, then the intensity of the light striking the light sensitive surface 45 at the radius $X_1$ decreases and becomes insufficient to produce an electrical signal output of minimum useful value. On the other hand, if the source of light were moved closer to the optical axis 43 of the photoscope 11, then the light signal would be focused closer to the center of the light sensitive surface, which is more sensitive, and produce an electrical signal output of greater amplitude.

If the target is next moved to the position of the target $T_2$ at range 2R, then the intensity $I_2$, of the light signal focused on the light sensitive surface 45 is reduced to one fourth the intensity at range R as shown in FIG. 3. However, the angle $\beta_2$ subtended by the target at range 2R is less so that the light signal will be focused on the light sensitive surface 45 at the radius $X_2$ which is approximately one fourth as sensitive as the portion within the radius $X_1$ as shown in FIG. 5. The increased sensitivity of the light sensitive surface 45 compensates for the decreased intensity of the light signal focused on the light sensitive surface 45 so that an electrical signal output of minimum useful value is still produced.

Finally, if the target is moved to the position of the target $T_3$ at the range 3R, the intensity $I_3$ of the light signal focused on the light sensitive surface 45 is reduced still further to one ninth the intensity at range R. However, the angle subtended by the target at 3R is less and the light is focused on the center of the light sensitive surface 45 within the radius $X_1$ which is the most sensitive portion of the photodiode 39. As a result, an electrical signal output of minimum useful value is still produced. As previously mentioned, the range 3R is assumed to be the maximum range of the photoscope, because beyond this range the intensity of the light signal focused on even the most sensitive portion of the light sensitive surface 45 is insufficient to produce an electrical signal output of minimum useful value.

In conclusion, it can be seen that if the sensitivity of the light sensitive surface 45 of the photodiode 39 varies so that a constant intensity light signal results in an electrical signal output that decreases inversely according to the square of the distance from the point where the light signal is focused to the center of the light sensitive surface 45, it will substantially fully correct for the increasing range and provide an area of vulnerability which is substantially independent of the target range within the effective minimum and maximum range of the system.

However, the varying sensitivity of the light sensitive surface 45 of the photodiode 39 can only provide a constant area of vulnerability over a certain interval of range, the maximum range being the distance from the nodal point 41 of the lens 37 to the target at which a light signal from the infrared light source 27 mounted on top of the target can pass through the nodal point of the lense and be focused on the center of the light sensitive surface 45 to produce an electrical signal output of minimum useful values. This range is shown for illustrative purposes in FIG. 2 as 3R. The minimum range is the distance from the photoscope 11 at which the optical axis 43 can intersect the target at any point and the light signal from the light source 27 mounted on top of the target will be focused on the edge of the light sensitive surface 45. This range is shown for illustrative purposes in FIG. 2 as the range R. However, it must be remembered that the purpose of a hit indicator system is to permit the tactical field training of personnel on as realistic basis as possible. Accordingly, it is desirable for the range of the photoscope 11 to approximate as much as possible the effective range of the weapon, such as, in the illustrative embodiment, a tank cannon.

The effective range of a tank cannon extends from the end of the cannon barrel to some maximum distance. The maximum range of the photoscope can be made coextensive with the maximum effective range of the tank cannon by simply designing a system wherein a light signal of a given constant intensity from a light source 27 at the maximum effective range of the tank cannon can be focused on the most sensitive portion of the light sensitive surface 45 of the photodiode 39 and produce an electrical signal output of minimum useful value. However, with a target having a given height and a photodiode 39 having a light sensitive surface 45 of a given radius $X_3$, the minimum effective range of the photoscope will not be coextensive with that of the weapon because at a close range, such as the range R', which is less than R, as illustrated in FIG. 2, the light signal from the light source 27 mounted on top of the target will pass through the nodal point of the lense 37 but not be focused on the light sensitive surface 45. Consequently, if the target is too close to the tank cannon, then the photoscope may not receive the light signal from the light source 27 mounted on top of the target, even though the tank cannon is aimed directly at the target and in reality would hit the target. Since the purpose of the hit indicator system is to simulate actual tactical conditions, it is apparent that the simple single lens-photodiode system of FIG. 2 fails in this objective at close range.

Figure 6:
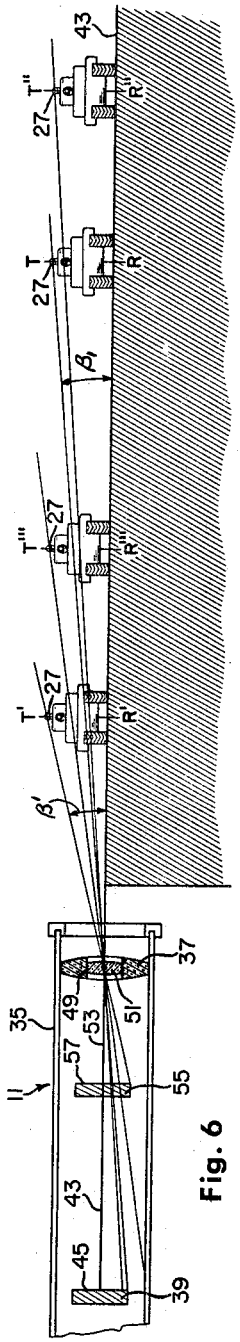
FIG. 6 illustrates the optical system of a coaxial photoscope in accordance with the invention so as to provide a photoscope with an extended overall range.

As shown in FIG. 6 the dual photoscope aspect of the present invention enables the achievement of an extended overall range which more closely approximates the actual effective range of a tank cannon. The photoscope 11 shown in FIG. 6 is, in some respects, similar to the single lens-photodiode photoscope 11 shown in FIG. 2 having a tubular housing 35 for mounting in the barrel of a tank cannon and containing a generally conventional first photoscope system having a large lens 37 mounted in the forward portion of the tubular housing 35 and a photodiode 39 mounted rearward at the focal point of the lens 37. The lens 37 has an optical axis 43 which passes perpendicularly through the center of the lense 37 and is desirably parallel to the tubular housing 35. In the center of the lens 37 and parallel to the optical axis 43 is a bore 49. The photodiode 39 has a disc-shaped light sensitive surface 45 the center of which is perpendicularly intersected by the optical axis 43. The photoscope 11 also contains a second photoscope system having a second lens 51 with an optical axis 53 and a second photodiode 55. The second lens 51, having a much smaller diameter and a shorter focal length than the first lens 37, is mounted in the bore 49 of the first lens 37 so that the optical axes 43 and 53 of the two lenses 37 and 51 are coincident. The second photodiode 55 is identical to the first photodiode 39 and has a disc-shaped light sensitive surface 57 with a sensitivity variation as shown in FIG. 5. The second photodiode is mounted rearward at the focal length of the second lens 51 so that the center of the light sensitive surface 57 is perpendicularly intersected by the optical axis 53.

As previously discussed in regard to FIG. 2, the focal length of the lens 37 and the diameter of the light sensitive surface 45 of the single lens-photodiode photoscope system determine a minimum range, R, at which a light signal from the light source 27 mounted on top of a target will be focused on the light sensitive surface 45 no matter where the optical axes 43 and 53 intersect the target. The minimum range is indicated by a ray of light passing through the nodal point 41 of the lens 37 and striking the edge of the light sensitive surface 45 of the photodiode 39. A target, T, at a minimum range, R, of the single lens-photodiode photoscope system is shown in both FIGS. 2 and 6. The second photoscope subsystem operates in the same manner as the first photoscope subsystem but because of the shorter focal length of the lens 51 has a minimum range R' which is much closer to the end of the barrel of the tank cannon than that provided by the first photoscope subsystem. The minimum range R' of the second photoscope subsystem is indicated in FIG. 6 by a target T' at a range R' which is much shorter than the minimum range R of the single lens photoscope 11 and therefore provides a much more realistic result.

The maximum range of the second photoscope subsystem is limited in the same manner as the maximum range of the first photoscope subsystem, i.e. the distance at which a light signal from an infrared light source 27 mounted on a target can be focused by the lens 51 on the most sensitive portion of the light sensitive surface 57 and cause the photodiode 55 to produce an electrical signal output of minimum useful value. Since the area of the second lens 51 is much smaller than that of the first lens 37, being on the order of 5–10% thereof, the intensity of the light signal focused on the light sensitive surface 57 of the second photodiode 55 is only a fraction of the intensity of the light signal focused on the light sensitive surface 45 of the first photodiode 39. Consequently, the maximum range of the second photoscope subsystem is much less than that of the first photoscope subsystem. Nevertheless, the maximum range of the second photoscope subsystem is arranged to be at least equal to or desirably somewhat greater than the minimum range R of the first photoscope subsystem so as to provide a slight overlap of the two ranges and insure a continuous interval of range. A target T", at range R", is shown in FIG. 6, for illustrative purposes, to indicate the maximum range of the second photoscope subsystem.

In FIG. 7 is shown schematically how the photodiodes 39 and 55 associated with each photoscope subsystem are electrically connected so as to produce the pulse which serves to actuate the modulator of the hit indicator system as shown in FIG. 1. In FIG. 6 there is shown a cross-sectional view of a large first lens 37, having a bore 49 within the center thereof, which focuses a light signal onto a first photodiode 39 which is located rearward at the focal plane of the first lens 37. The electrical signal output of the first photodiode 39 is amplified by an amplifier 59 in a conventional manner and supplied to the first Schmitt trigger 61 which in turn produces a sharp electrical pulse which passes through a conventional OR gate circuit 63 to an emitter follower driver 65 which produces an output signal that actuates the modulator 15 as shown in FIG. 1. A second photoscope subsystem having a second lens 51 much smaller than the first lens 37 is mounted in the bore 49 of the first lens 37. Mounted rearward at the focal length of the second lens 51 is a second photodiode 55 substantially identical to the first photodiode 39. The electrical signal output of the second photodiode 55 is amplified by a second amplifier 67 is a conventonal manner and supplied to a second Schmitt trigger 69 which in turn produces a sharp eelctrical pulse which passes through the OR gate 63 to the emitter follower driver which produces an output signal that may be used to actuate the hit indicator 31 and modulator 15 shown in FIG. 1.

In FIG. 8 is shown a cross-sectional view of the details of the construction of a coaxial photoscope 11 suitable for installation in the barrel of the tank cannon and containing a dual photoscope system according to the invention and as previously generally described. The photoscope unit generally consists of two sections, generally indicated at 71 and 73, of tubular housing 35, which are suitably fastened together. The first section 71 contains the lenses 37 and 51 and the photodiodes 39 and 55 associated with the dual photoscope system, and the second section 73 contains the electrical apparatus 59–69 associated with the dual photoscope system as shown in FIG. 7. At the rearward end, generally indicated at 79, of the first section 71 of the tubular housing 35, and attached to the inside wall 81, is an end ring 83 adapted for fastening by means of bolts 85 to one end of the second section 73 of the tubular housing 35. In the forward end 75 of the first section 71 of the tubular housing 35 is a lens mounting ring 87 having a wedge-shaped piece attached thereto which is fastened to the wall of the tubular housing 35 and holds the first lens 37 which is associated with the first photoscope subsystem in the proper position and desirably so that the optical axis 43 of the first lens 37 is coincident with the axis of the tubular housing 35. In the center of the first lens is a bore 49 wherein the second lens, which is associated with the second photoscope subsystem, is mounted desirably in a position so that the optical axis 53 of the second lens 51 is coincident with the axis 43 of the first lens 37. At the rearward end 79 of the forward section 71 and generally at the focal plane of the large first lens 37 is another ring 89 in which is mounted a pad 91 which contains the photodiode 39 in the center thereof and in such a position that the center of the light sensitive surface 45 of the photodiode 39 is perpendicularly intersected by the optical axis 43 at the focal length of the large first lens 37. A sectional view showing the arrangement of the pad 95 with the photodiode 39 mounted therein is shown in FIG. 10. Rearward of the lens mounting ring 87 in the forward end 79 of the first section 71 and generally at the focal plane of the small second lens 51 is another ring 93 in which is mounted a spider 95 the center of which contains a second photodiode 55 which is located in a position such that the center of the light sensitive surface 57 is perpendicularly intersected by the optical axis 53 at the focal point of the small second lens 51. A sectional view showing the configuration of the spider 95 with the photodiode 55 contained therein is shown in FIG. 11. Connected to each photodiode are conductive cables 97 and 99 which lead to the electrical apparatus contained in the second section 73 of the coaxial photoscope 11. The pad 91 and the spider 95 in which the photodiodes 39 and 55 are respectively mounted have a three point laterally adjustable suspension as provided respectively by set screws 121, 123, 127, 129, and 131. Also, the rings 89 and 93 are adjustable in the forward and rearward direction and held in place by set screws 133 and 135 respectively.

At one end of the second section 73 which will be designated the forward end, and generally indicated at 101, is a header plate 103 which is attached to the inside wall 81 of the tubular housing 35 in the second section 73. The forward end 101 of the second section 73 is attached to the rearward end 79 of the first section 71 by means of bolts 85 which fasten the header plate 103 of the second section 73 to the end ring 83 of the first section 71. At the opposite end of the second section 73, which will be designated as the rearward end, and generally indicated at 105, is a plate 107 which is attached to the inside wall 81 of the tubular housing 35. Mounted on the plate 103 and contained inside the second section 73 is the electrical apparatus 59–69 associated with the dual photoscope system as shown in FIG. 7. This electrical apparatus 59–69 is connected to the remainder of the hit indicator system as shown in FIG. 1 by means of the terminal plug 109 which connects the electrical apparatus 59–69 through a conductive cable which extends through the breech of the tank cannon to the remainder of the electrical system. On the other side of the plate 107 is fastened an eye-end turnbuckle 111 for use in installing the coaxial photoscope in the barrel of the tank cannon. As shown in FIG. 7, one end of a steel cable 113 engages the eye of the turnbuckle 111 of the photoscope and the opposite end of the steel cable 113 is fastened to another eye-end turnbuckle 115 which is attached to a block 117 located in the breech 119 of the tank cannon so as to exert a force on the photoscope 11 which tends to hold the photoscope tightly in the proper position in the barrel of the tank cannon.

In operation, each tank participating in simulated tactical field training employing a hit indicator system of the type described will have an omnidirectional radio frequency antenna 19 and an infrared source 27 mounted on the top of the tank. Each tank cannon will have a coaxial photoscope 11 inserted in the bore of the tank cannon and properly positioned in the bore by the mounting plate 87 of the photoscope 11. The photoscope 11 will be held in the bore by a steel cable 113 attached to an eye-end turnbuckle 115 which is attached to a block 117 in the breech 119 of the cannon which engages the eye-end turnbuckle 111 at the opposite end of the photoscope 11. The electrical apparatus 59–69 associated with the coaxial photoscope will be connected to the remainder of the electrical apparatus of the hit indicator system by means of a conductive cable extending from the terminal plug 109 in the end plate 107 of the photoscope 11 through the breech of the tank cannon.

During the course of the tactical field training a tank gunner will spot a target, such as another tank as indicated in FIG. 4, take aim and, when he believes the target is properly aligned with the sights of his cannon, fires the tank cannon by pulling a trigger 13 which causes a pyrotechnic display in the form of a blast. This also causes a pulse to be supplied to the modulator 15 which turns on a radio frequency transmitter 17 thereby causing a pulse to be transmitted omnidirectionally from the antenna 19 mounted on top of the tank. This signal is received by the antenna 21 at the target and detected in the receiver 23. The receiver 23 actuates the pulse generator 25 thereby causing the infrared source 27 mounted on top of the target to radiate a pulse signal. If the target is at the range 4R as indicated in FIG. 2, which is beyond the maximum effective range of the tank cannon and beyond the maximum range of the photoscope 11, then even if the tank cannon is properly aimed at the target, the intensity of the light signal from the target will not be great enough to cause the photodiode 39 associated with the first photoscope system to produce an electrical signal output of minimum useful value and consequently the Schmitt trigger 69 associated with the photodiode 39 will not operate so as to produce a pulse which will actuate the modulator 15.

If the target moves closer toward the tank cannon, when it reaches a point indicated by the target $T_3$ at the range 3R the tank gunner may decide to fire his cannon again. Assuming the cannon is properly aimed, when the trigger 13 is pulled the resulting target interrogation pulse will again cause the infrared light source 27 mounted upon the top of the target to flash another light signal. Since the target is within the maximum range of the photoscope 11 which is coextensive with the maximum effective range of the tank cannon, the light signal will be focused by the large first lens 37 on the center and within the radius $X_1$ of the light sensitive surface 45 of the photodiode 39, which is the most sensitive portion of the light sensitive surface, thereby causing the photodiode 39 to produce an electrical signal output of minimum useful value which is amplified by the amplifier 59 and operates the Schmitt trigger 61 which produces a pulse that passes through the OR gate 63 and is supplied to both the modulator 15 and the hit indicator 31 of the tank. The pulse supplied to the modulator 15 causes another radio frequency signal to be transmitted to the target which actuates the target hit indicator 33 thereby causing a pyrotechnic display in the form of a blast and informing the target that a hit has been scored. The pulse supplied to the hit indicator 31 of the tank actuates it and informs the tank gunner that a hit has been scored. If the tank gunner did not have the cannon properly aimed then the light signal from the infrared source 27 would be focused beyond the radius $X_1$ on a less sensitive portion of the light sensitive surface 45 and the intensity of the light signal would be insufficient to produce an electrical signal output of minimum useful value and therefore would fail to operate the Schmitt trigger 61 to produce the pulse necessary to actuate the modulator 15 and the hit indicators 31 and 33.

Assuming the tank cannon was not properly aimed and therefore a hit was not registered, as the target moves closer to the tank, the tank gunner may try again when the tank reaches the position $T_2$ at range 2R as indicated in FIG. 2. When the tank gunner again believes that he has the tank cannon properly aimed and pulls the trigger 13 the resulting radio frequency target interrogation pulse will again cause the infrared light source 27 mounted on top of the target to flash a light signal. If the cannon is properly aimed, the light signal will be focused on a portion of the light sensitive surface of the photodiode within the radius $X_2$, as shown in FIG. 5, and cause an electrical signal output of useful value to be produced which is then amplified by the amplifier 59 and supplied to the Schmitt trigger 61 which will operate and cause a pulse to be produced which will pass through the OR gate 63 to both the modulator 15 and the hit indicator 31 of the tank. The pulse supplied to the modulator 15 causes another radial frequency signal to be transmitted to the target which actuates the target hit indicator 33 thereby causing a pyrotechnic display in the form of a blast and informing the target that a hit has been scored. The pulse supplied to the hit indicator 31 of the tank actuates it and informs the gunner that a hit has been scored. However, if the tank cannon was not properly aimed, then the light signal is focused on a portion of the light sensitive surface 45 beyond the radius $X_2$ and is insufficient to cause the photodiode 39 to produce a signal of minimum useful value.

Assuming the gunner did not have the tank cannon properly aimed and that the target moves still closer to the tank, he aims and fires again when the tank is at the range R as indicated in FIGS. 2 and 6. When the tank gunner pulls the trigger 13, the resulting radio frequency target interrogation signal will cause the light source 27 mounted on top of the target to again flash a light signal. Since the target is within the range of both photoscope subsystems, the light signal will be focused by both lenses 37 and 51 on their respective photodiodes 39 and 55 and cause both photodiodes 39 and 55 to produce an electrical signal output of useful value if the cannon is properly aimed. These signals will be amplified respectively by the amplifiers 59 and 67 and supplied respectively to the Schmitt triggers 61 and 69, both of which will operate and supply pulses which will pass through the OR gate 63 to both the modulator 15 and the hit indicator 31 of the tank cannon. The pulse supplied to the modulator 15 will cause another radio frequency signal to be transmitted to the target which actuates the target hit indicator 33 thereby causing a pyrotechnic display in the form of a blast and informing the target that a hit has been scored while the pulse supplied to the hit indicator 31 of the tank actuates it and informs the gunner that a hit has been scored. However, if the gunner again did not properly aim the cannon at the target then the light signal from the infrared source 27 will not be focused to a point on the light sensitive surface 45 nor on a portion of a light sensitive surface 57 which is sensitive enough to cause the photodiode 55 to produce an electrical output signal of minimum useful value in which case neither Schmitt triggers 61 and 69 will be operated and consequently no hit registered.

Assuming the tank gunner missed the target and the target approaches still closer to the tank, the gunner may decide to try again. However, note that the range R is the minimum range of the photoscope subsystem comprising the lens 37 and the photodiode 39 at which the optical axis of the lens 37 which is bore sighted with the barrel of the tank cannon, can intersect the target at any point and the light signal from the infrared light source 27 can be focused by the lens 37 on the light sensitive surface 45 of the photodiode. Consequently, as the target comes closer than the range R, it is generally out of the interval of range provided by the large lens 37 and associated photodiode 39 and within the interval of range provided by the small lens 51 and associated with photodiode 55. A direct hit on the infrared light source 27 when within the maximum range will, of course, always be detected by the photodiode 39.

When the target is at the range R' as shown in FIG. 6 and the tank gunner believes the cannon is properly aimed, he will pull the trigger and the resulting radio frequency target interrogation signal will cause the infrared light source 27 mounted on the top of the target to flash a light signal. If the tank cannon is properly aimed, then the small second lens 51 associated with the second photoscope subsystem will focus the light signal on the light sensitive surface 57 of the second photodiode 55 resulting in an electrical signal output of useful value. The electrical signal output is then amplified by amplifier 67 and causes the Schmitt trigger 69 to operate and produce a pulse which passes through the OR gate 63 and to both the modulator 15 and the hit indicator 31 of the tank. The pulse supplied to the modulator 15 causes another radio frequency signal to be transmitted to the target which actuates the target hit indicator 33 thereby causing a pyrotechnic display in the form of a blast and informing the target that a hit has been scored while the pulse supplied to the hit indicator 31 of the tank actuates it and informs the gunner that a hit has been scored.

It is noted that at the range R' the light signal may be focused by the large lens 37 of the first photoscope subsystem at a point beyond the light sensitive surface 45 of the first photodiode 39. At a range less than R' a light signal from the target may be focused by the small lens 51 at a point beyond the light sensitive surface 57 of the second photodiode 55 because the range R' is the minimum whole target range of the photoscope 11 at which it is possible for the tank cannon to be pointed at the target and always receive the light signal. As the range decreases from the minimum whole target range R', while hits may still be scored, not all properly aimed shots are scored as hits, as the gunner must aim closer to the infrared source mounted on top of the target in order for the photoscope to receive the light signal. This range R' may of course be further reduced by employing a third, or other additional, coaxial lens and photodiode subsystem in the photoscope, if desired.

While the invention has been illustrated and described with respect to a single preferred embodiment, it will be apparent to those skilled in the art that various modifications and improvements may be made without departing from the scope and operation of the invention. For example, although a coaxial lens arrangement has been disclosed wherein the center of the large lens has a bore in which the small second lens is mounted, it will be obvious to others skilled in the art that the small diameter shorter focal length lens may be mounted directly on the face of the large lens, with the combined lenses in the area of the smaller lens providing the desired shorter focal length, and thereby obviating the necessity for the mounting hole in the large lens as in the illustrated embodiment. However, for purposes of simplification of optics and rigidity of components, the illustrated embodiment is much more preferred. Also, it is obvious that other photo-responsive elements can be used instead of photodiodes. Accordingly, it is to be understood that the invention is not to be limited by the illustrative embodiment but only by the scope of the appended claims.

That which is claimed is:

1. In a simulated hit indicator arrangement including a weapon having a barrel and a target interrogating transmitter operatively associated with a target signal source; and a photoelectric target signal responsive telescope detector arrangement arranged for synchronous directive motion with the barrel of the weapon, the improvement comprising:
   a single unit dual range photoelectric target signal responsive telescope detector arrangement having first and second lenses and first and second photoelectrically responsive elements;
   said first lens and said first photoelectrically responsive element being operatively associated and being sensitive to target signals produced over a first interval of range distance;
   said second lens and said second photoelectrically responsive element being operatively associated and being sensitive to target signals produced over a second interval of range distance;
   said first innterval of range distance being different from said second interval of range distance.

2. In a simulated hit indicator arrangement as defined in claim 1 wherein:
   said first interval of range distance has a maximum range greater than the maximum range distance of said second interval of range distance; and
   the minimum range distance of said first interval being less than the maximum range distance of said second interval; and
   said second interval of range distance having a minimum range distance less than said first interval minimum range distance.

3. In a simulated hit indicator arrangement as defined in claim 2 wherein:
   said second lens has a shorter focal length than said first lens.

4. In a simulated hit indicator arrangement as defined in claim 2 wherein:
   said first lens has a larger diameter, with greater light gathering capability, and a longer focal length than said second lens.

5. In a simulated hit indicator arrangement as defined in claim 4 wherein:
   said photoscope systems are arranged longitudinally with respect to each other.

6. In a simulated hit indicator arrangement as defined in claim 5 wherein:
   said first lens and said first photoelectrically responsive element encompasses at least a portion of the longitudinal space occupied by said second lens and said second photoelectrically responsive element.

7. In a simulated hit indicator arrangement as defined in claim 5 wherein:
   the centers of said photoelectrically responsive elements and the centers of said lenses are disposed on a common axis.

8. In a simulated hit indicator arrangement as defined in claim 6 wherein:
   said first lens has a bore wherein said second lens is mounted.

9. In a simulated hit indicator arrangement as defined in claim 6 wherein:
   the centers of said photoelectrically responsive elements and centers of said lenses are disposed on a common axis.

10. In a simulated hit indicator arrangement as defined in claim 9 wherein:
    the center of said first lens has a bore wherein said second lens is mounted.

11. In a simulated hit indicator arrangement as defined in claim 2 wherein:
    said first photoelectrically responsive element causes a first electrical signal output upon receiving a light signal; and
    said second photoelectrically responsive element causes a second electrical signal output upon receiving a light signal; and
    said first and second electrical signal outputs are supplied to a common electrical circuit for producing a single electrical signal.

12. In a simulated hit indicator arrangement as defined in claim 11 wherein:
    said common electrical circuit comprises an OR gate having two input terminals and one output terminal; and
    said electrical signal output from said first photoelectrically responsive element is supplied to said first input terminal of said OR gate; and
    said electrical output signal from said second photoelectrically responsive element is supplied to said second input terminal of said OR gate circuit; and
    said OR gate circuit produces a single signal upon receiving an electrical output signal from either or both of said photoelectrically responsive elements.

13. In a simulated hit indicator arrangement as defined in claim 12 wherein:
    said output terminal of said OR gate is operatively connected to means for registering a hit at either said target or said weapon or both.

14. In a simulated hit indicator arrangement including a weapon having a barrel and a target interrogating transmitter operatively associated with the firing mechanism of the weapon; a receiver operatively associated with a target signal source; and a photoelectric target signal responsive telescope detector arrangement with an optical axis attached to the barrel of the weapon, the improvement comprising:
    a dual photoelectric target signal responsive telescope detector arrangement having first and second lenses and first and second photoelectrically responsive element;
    said first and second lenses and said first and second photoelectrically responsive elements being disposed within the barrel of a tank cannon;
    said first lens and said first photoelectrically responsive element being operatively associated and being sensitive to target signals produced over a first interval of range distance;
    said second lens and said second photoelectrically responsive element being operatively associated and being sensitive to target signals produced over a second interval of range distance; and
    said first interval of range distance being different from second interval of range distance.

15. In a simulated hit indicator arangement as defined in claim 14 wherein:
    said first interval having a maximum range distance greater than the maximum range distance of said second interval,
    said minimum range distance of said first interval being less than the maximum range distance of said second interval; and said second interval having a minimum range distance less than that of said first interval.

16. In a simulated hit indicator arrangement as defined in claim 15 wherein:
said second lens has a shorter focal length than said first lens.

17. In a simulated hit indicator arangement as defined in claim 15 wherein:
said first lens has a larger diameter, with greater light gathering capability, and a longer focal length than said second lens.

18. In a simulated hit indicator arrangement as defined in claim 17 wherein:
said photoscope systems are arranged longitudinally with respect to each other.

19. In a simulated hit indicator arrangement as defined in claim 18 wherein:
the centers of said photoelectrically responsive elements and the centers of said lenses are disposed on a common axis.

20. In a simulated hit indicator arangement as defined in claim 18 wherein:
the arrangement of said first lens and said first photoelectrically responsive element encompasses at least a portion of the arrangement of said second lens and said second photoelectrically responsive element.

21. In a simulated hit indicator arrangement as defined in claim 20 wherein:
the centers of said photoelectrically responsive elements and the centers of said lenses are disposed on a common axis.

22. In a simulated hit indicator arrangement as defined in claim 20 wherein:
said first lens has a bore wherein said second lens is mounted.

23. In a simulated hit indicator arrangement as defined in claim 21 wherein:
the center of said first lens has a bore wherein said second lens is mounted.

24. In a simulated hit indicator arrangement defined in claim 15 wherein:
said first photoelectrically responsive element causes a first electrical signal output upon receiving a light signal; and
said second photoelectrically responsive element causes a second electrical signal output upon receiving a light signal; and
said first and second electrical signal outputs are supplied respectively to first and second input terminals of an OR gate having an output terminal; and
said OR gate circuit produces a single signal on receiving an electrical output signal from either or both of said photoelectrically responsive elements.

25. In a simulated hit indicator arrangement as defined in claim 24 wherein:
said output terminal of said OR gate is operatively connected to means for registering a hit at either said target or said weapon or both.

26. In a simulated hit indicator arrangement including a weapon having a barrel and a target interrogating transmitter operatively associated with the firing mechanism of the weapon; a receiver operatively associated with a target signal source; and a photoelectric target signal responsive telescope detector arrangement with an optical axis attached to the barrel of the weapon, the improvement comprising:
said photoelectric target signal responsive telescope-detector having first and second lenses with their axes being coincident to provide a common axis; and
said photoelectric target signal responsive telescope detector having first and second photoelectrically responsive elements with the light sensitive surface thereof being centered on the common axis of said lenses; and
said first lens and said first photoelectrically responsive element being operatively associated and being sensitive to target signals produced over an interval of range distance having a first maximum and a first minimum range distance; and
said second lens and said second photoelectrically responsive element being operatively associated and being sensitive to target signals produced over a second interval of range distance having a second maximum and a second minimum range distance.

27. In a simulated hit indicator arrangement as defined in claim 26 wherein:
said second lens has a shorter focal length than said first lens and the interval of range provide by said second lens and said second photoelectrically responsive element overlaps said first minimum range.

28. In a simulated hit indicator arrangement as defined in claim 27 wherein:
said second lens has a smaller diameter than said first lens; and
the center of said first lens contains a bore wherein said second lens is mounted.

29. In a simulated hit indicator arrangement defined in claim 28 wherein:
said first photoelectrically responsive element causes a first electrical signal output upon receiving a light signal; and
said second photoelectrically responsive element causes a second electrical signal output upon receiving a light signal; and
said first and second electrical signal outputs are supplied respectively to first and second input terminals of an OR gate having an output terminal; and
said OR gate circuit produces a single signal on receiving an electrical output signal from either or both of said photoelectrically responsive elements.

30. In a simulated hit indicator arrangement as defined in claim 29 wherein:
said output terminal of said OR gate is operatively connected to means for registering a hit at either said target or said weapon or both.

References Cited

UNITED STATES PATENTS 3,104,478  9/1963  Strauss et al. _____ 35—25
3,352,030  11/1967  Waldhauer _____ 35—25

EUGENE R. CAPOZIO, Primary Examiner

PAUL V. WILLIAMS, Assistant Examiner

U.S. Cl. U.S.
250—208